A. B. SPRINGSTEEN.
Improvement in Cultivators.

No. 126,991. Patented May 21, 1872.

UNITED STATES PATENT OFFICE.

ASA BENNETT SPRINGSTEEN, OF SCHODACK LANDING, NEW YORK.

IMPROVEMENT IN CULTIVATORS.

Specification forming part of Letters Patent No. 126,991, dated May 21, 1872.

Specification describing a new and Improved Corn-Hoer, invented by ASA BENNETT SPRINGSTEEN, of Schodack Landing, in the county of Rensselaer and State of New York.

Figure 1:
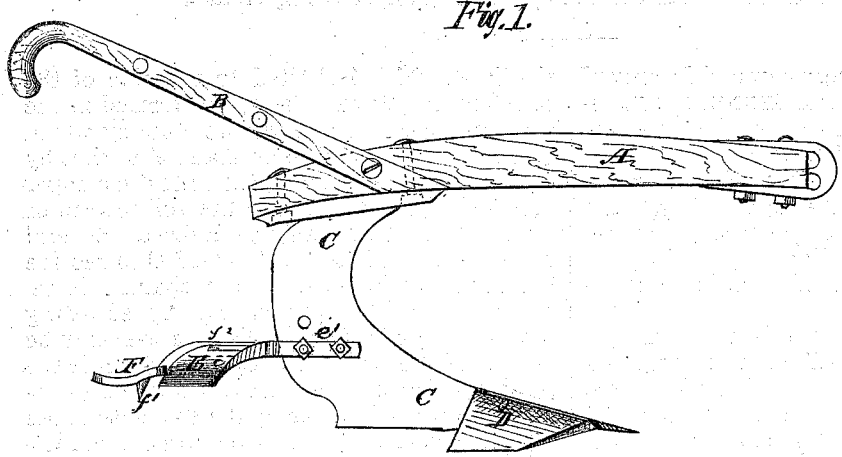
Figure 2:
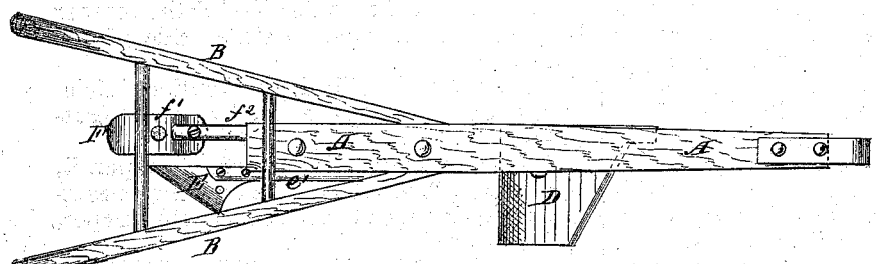
Figure 3:
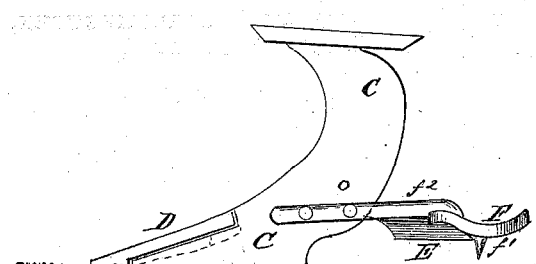

Figure 1 is a side view of my improved hoer. Fig. 2 is a top view of the same. Fig. 3 is a detail side view of the same, showing the other side from that shown in Fig. 1.

Similar letters of reference indicate corresponding parts.

My invention has for its object to furnish a simple, convenient, and effective plow for cultivating corn and other crops planted in rows, which may be readily adjusted to scrape the soil toward or from the plants, as may be desired; and it consists in the construction and combination of the various parts of the plow, as hereinafter more fully described.

A is the plow-beam, to the rear part of which the handles B are applied in the ordinary manner. C is the standard, the upper end of which is securely attached to the beam A. The lower end of the standard C projects forward, and has a flange upon its side to form a seat for the share D. The share D is made wide, broad, and low, as shown in Figs. 1, 2, and 3, being about twice the size of an ordinary plowshare. The share D is designed to pass beneath the soil, stir it up, and allow it to fall back loosely in its former place. E is the scraper, which is made triangular in form, and with its rear edge inclined or curved downward so as to move or scrape the soil to one side. The scraper E is bolted to an arm or shank, $e'$, which is bolted to the side of the standard C. Several holes are formed in the scraper-plate E to receive the bolts by which it is secured to the arm or shank $e'$, so that by removing the rear one of said bolts the scraper may be adjusted to scrape the soil toward or from the plants, as may be desired. Several holes are formed in the standard C to receive the bolts by which the arm or shank $e'$ is secured to said standard, so that by adjusting the rear one of said bolts the scraper may be raised or lowered, as may be desired. F is the leveler, which is made with a downwardly-projecting tooth, $f^1$, to stir up the soil close to the plants and smooth it off, at the same time rooting up any grass, weeds, &c., that may be growing close to the plants. The leveler F is securely bolted to an arm or shank, $f^2$, which is bolted to the standard C.

By removing the leveler F $f^1$ $f^2$ the scraper E $e'$ may be attached to either side of the standard C.

Having thus described my invention, I claim as new and desire to secure by Letters Patent—

The combination, with a surface-scraper, E, of a leveler, F, provided with the root-extractor $f^1$, and arranged in the rear of said scraper, as described.

ASA BENNETT SPRINGSTEEN.

Witnesses:
WILLIAM H. SCHERMERHORN,
HORACE BENNETT.